United States Patent [19]
Remy et al.

[11] 4,289,378
[45] Sep. 15, 1981

[54] APPARATUS FOR ADJUSTING THE FOCAL POINT OF AN OPERATING LASER BEAM FOCUSED BY AN OBJECTIVE

[76] Inventors: Ernst Remy, No. 22, Georgenstrasse, 8 Munich 50; Eberhard Unsöld, 16a, Dr. Hofmeister Strasse, 4042 Oberschleissheim, both of Fed. Rep. of Germany

[21] Appl. No.: 84,483

[22] Filed: Oct. 15, 1979

Related U.S. Application Data

[63] Continuation-in-part of Ser. No. 917,699, Jun. 21, 1978, abandoned, which is a continuation of Ser. No. 752,764, Dec. 20, 1974, abandoned.

[51] Int. Cl.³ .................... G02B 27/14; G02B 21/06
[52] U.S. Cl. .................................. 350/174; 350/255; 128/303.1; 128/395; 219/121 LS; 219/121 LV; 219/121 LZ
[58] Field of Search ............... 350/174, 169, 81, 46, 350/47, 33, 20, 255; 351/16; 128/303.1, 395; 219/121 LS, 121 LU, 121 LV, 121 LZ

[56] References Cited
U.S. PATENT DOCUMENTS

| | | | |
|---|---|---|---|
| 3,096,767 | 7/1963 | Gresser et al. | 351/16 |
| 3,710,798 | 1/1973 | Bredemeier | 219/121 LS |

Primary Examiner—Jon W. Henry
Attorney, Agent, or Firm—John C. Smith, Jr.

[57] ABSTRACT

A method of and an apparatus for adjusting the focal point of a working laser beam onto a microscopic target region of a transparent biological object to locate the focal point a spaced predetermined microscopic distance from an interface of the object is described. Separate working and auxiliary laser beams are produced which are then collinearly superimposed in parallel relationship, the auxiliary laser beam having a wavelength within the visible range and different from the wavelength of the working laser beam. The superimposed laser beams are focused jointly through the objective of a microscope onto the object. First variable focusing means placed in the path of one of the laser beams is controlled to produce a spacing between the focal spots equal to the predetermined distance. A further variable focusing means in the path of both the working and laser beams is controlled to jointly move the focal spots of both beams without varying the distance therebetween until the focal spot of the auxiliary laser beam appears on the interface of the object, whereby the working laser beam is focused the predetermined distance from the interface in the object.

4 Claims, 3 Drawing Figures

4,289,378

APPARATUS FOR ADJUSTING THE FOCAL POINT OF AN OPERATING LASER BEAM FOCUSED BY AN OBJECTIVE

INTRODUCTION

This is a continuation-in-part of copending and now abandoned application Ser. No. 917,699 filed June 21, 1978, which is a continuation application of copending and now abandoned application Ser. No. 752,764 filed Dec. 20, 1974.

BACKGROUND OF THE INVENTION

This invention relates to an apparatus and a method of adjusting the focal point of an operating laser beam onto a selectable microscopic target region within an object, preferably a biological object, to be treated and observed under a microscope.

The treatment or destruction of material within a defined microscopically small region by a laser beam has become an important tool in scientific biological research. An example of its employment is the defined destruction of particular areas of cells in living tissues such as cell nuclei, chromosomes, etc., for the purposes of investigating the result of such cellular damage or for analyzing the composition of the materials that are vaporized by such treatment. In this and similar applications, the problem arises of very precisely focusing the operating laser beam onto a preselected microscopic target region typically having dimensions in the order of only one or a few microns without adversely affecting adjacent regions. This problem is difficult to solve for a number of reasons:

First, the operating laser beam is normally invisible or only intermittently visible.

Second, the operating laser beam should not be switched on before the adjustment has been made in order to avoid damage to the object by incorrect adjustment.

Third, the focusing and adjusting of the laser beam should be made without interfering with viewing the object through a microscope and its positioning in the optimum position under the microscope's objective.

Fourth, a biological object or preparation made for research of the aforementioned kind is normally completely transparent without exhibiting to the observing eye interior structures or boundaries which would serve as markings for estimating the steps of the location of a particular target region.

In the general art of using invisible or intermittently visible laser beams as a tool, for example in microsurgery, it has been common practice to make the main or working laser beam visible by superimposing on the laser beam a parallel beam of visible light, preferably a visible auxiliary laser beam. One example thereof is disclosed in U.S. Pat. No. 3,710,798 to Bredemeier where a marker beam from an He-Ne-laser is superimposed on an operating beam from a $CO_2$-laser and both beams are jointly focused onto a target site on the surface of a human body portion to be operated upon, said portion being viewed through a microscope. The two laser beams are focused by a focusing lens bypassing the microscope, and a further lens system is interposed in the marker beam to compensate for chromatic inaccuracies of the focusing lens and thereby to provide exact coincidence of the focal points of the two laser beams. This prior art system could not be used when microscopic areas on the order of one or a few microns in diameter are being observed and then only for a distance of a few millimeters. Also, in most cases an immersion fluid must be interposed between the object and the objective of the microscope. Moreover, the system would not help to locate the focal point of the operating laser beam at a microscopic region somewhere within a biological object where the object is completely transparent and no light from the visible marker laser beam would be scattered back through the microscope.

U.S. Pat. No. 3,096,767 to Gresser et al discloses a medical apparatus fo photo-cauterizing portions of the human body and which is adapted to produce a laser beam which can be focused by variable focusing means onto the desired part of the human body and which simultaneously can be viewed through a viewing apparatus. Four parallel visible light beams produced by an ordinary lamp and an aperture mask are superimposed on the laser beam and focused through the same variable focusing means so as to merge at a focal spot coincident with the focal spot of the laser beam. The possibility of longitudinally displacing the focal spot of the visible light beam from the focal spot of the laser beam is mentioned but means for achieving such displacement is not disclosed. This prior art apparatus too, would not be useful for adjusting the invisible laser focal spot to a very small micro-region located within a transparent object viewed under high magnification through a microscope.

SUMMARY OF THE INVENTION

It is an object of the invention to provide an apparatus and a method whereby a working laser beam may be very precisely focused to a microscopic target region of cellular, or even of subcellular size, located at any desired depth within a transparent biological object viewed under a microscope.

Another object of the invention is to provide a method for adjusting the focal spot of a working laser beam to a desired depth within a transparent object using an interface between portions of different optical density or refractive index as a reference.

A still further object of the invention is to provide an apparatus whereby a working laser beam and an auxiliary marker laser beam may be focused onto a microscopic target region within a biological object without interfering with its viewing under high magnification through a microscope and whereby the locations within the object of the plane containing the focal spot of said working laser beam, the plane containing the focal spot of the auxiliary laser beam and the object plane of the visual focusing of the microscope may be varied independently of each other.

It has been found that these and other objects of the invention may be attained by focusing the superimposed working and auxiliary laser beams onto the object through the objective lens of the viewing microscope, with the desired target region of the object located in the plane of sharpness of the microscope, controlling variable focusing means placed into the path of at least one of the laser beams so as to produce a longitudinal spacing between the focal spots produced by the objective, and controlling variable focusing means placed into the path of both the working and auxiliary laser beams to jointly move the focal spots of both beams without varying the distance therebetween until the focal spot of the auxiliary laser beam appears on the interface of the object. Thus, while a desired target region remains fixedly adjusted to the plane of sharp viewing of the microscope, and the focusing of the laser beams onto the object does not interfere with the object being viewed under high magnification and in close distance to the microscope objective and even through an immersion fluid positioned therebetween, not only can the locations of the focal spots of the working and auxiliary laser beams, respectively, be varied independently of each other, but the bright light spot, which will be observed through the microscope when the otherwise invisible marker laser beam focus is brought to coincide with an optical interface of the object, serves to define a reference position, such as a cellular boundary or the like, for determining the position of the desired target region having a desired predetermined distance from such boundary.

In one embodiment of the apparatus a variable focusing means is interposed in the visible marker light beam for producing the longitudinal spacing of the focal spots, and second variable means is interposed in the superimposed laser beams ahead of the microscope's objective.

In another embodiment, variable focusing means are interposed in each of the working and auxiliary laser beams, respectively, and first control means are provided to establish a predetermined difference in setting of the two variable focusing means, and second control means are provided to jointly vary the setting of the two variable focusing means.

BRIEF DESCRIPTION OF THE DRAWINGS

The invention will now be described in greater detail, by way of example only and without limiting the scope of the invention in any way, by reference to the accompanying drawings which diagrammatically and in a highly simplified form illustrate the invention and apparatus for performing the same. In the drawings.

DESCRIPTION OF THE PREFERRED EMBODIMENTS

Figure 1:
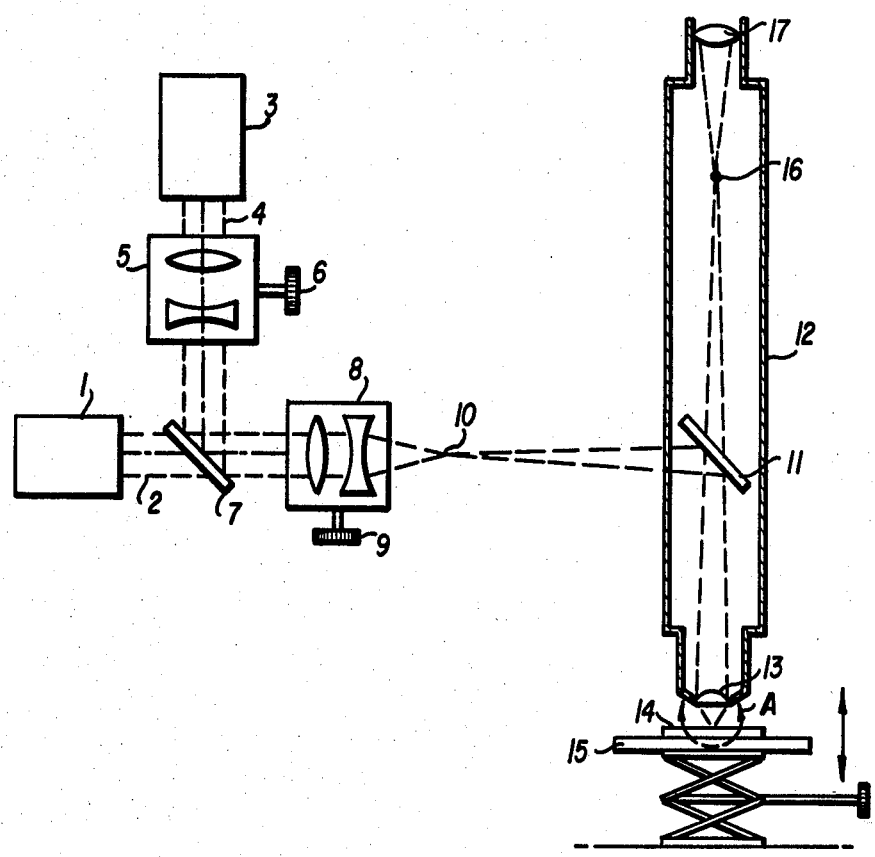
FIG. 1 is an elevational view, partly in section, of the apparatus according to one embodiment of the invention.

In the apparatus shown in FIG. 1 a working laser 1 emits a working laser beam 2, for example an ultraviolet laser beam, and an auxiliary laser 3, for example an He-Ne-laser, emits a marker laser beam 4 in the visible wavelength range. First variable focusing means 5 is placed in the marker laser beam 4 and comprises a lens arrangement, preferably a confocal lens arrangement, controllable through a manual control 6. The working and auxiliary laser beams 3 and 4 are collinearly superimposed by a beam splitter 7, and second variable focusing means 8 comprising a lens arrangement, preferably a confocal lens arrangement, and a manual control 9 is interposed in the superimposed laser beams for producing an intermediate focus 10. The superimposed laser beams are then coupled through a second beam splitter 11 into the optical path of a microscope 12 and are focused through the objective lens 13 of the microscope onto an object 14 placed on a support 15 which is vertically movable to vary the distance between the object and the objective lens 13. The microscope 12 is also used for observing the object 14 under high magnification, and when the desired target region of the object 14 is correctly placed into the plane of sharp focus of the objective 13, this will produce an intermediate image at 16 which can be viewed through the microscope's eyepiece 17. Other important components of a normal microscope such as trans- or top-illumination, filters, interchangeable objectives, diaphragms and the like are omitted in FIG. 1 for simplicity.

Figure 2:
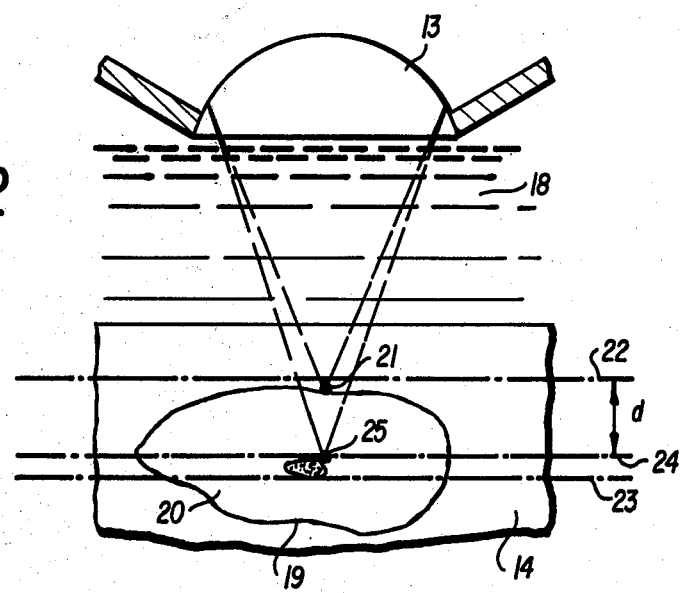
FIG. 2 is a sectional view in larger scale of the detail marked A in FIG. 1.

The operation of the apparatus shown in FIG. 1 is explained with reference to FIG. 2 which shows in larger scale the detail encircled at A in FIG. 1.

It is assumed that the target region to be treated with the working laser beam focus is the nucleus of a cell contained in the object 14. The object 14 is viewed through the microscope 12 at high magnification with a small distance between the objective 13 and the surface of the object 14, and normally an immersion fluid 18 will be interposed. By varing the setting of the variable focusing means 5 by means of the control 6 the position of the focal spot 21 of the visible auxiliary laser beam 4 may be varied. This focal spot 21 will normally not be clearly visible in the microscope as long as it is located in a uniformly transparent and refractive portion of the object, since no light will be scattered back into the microscope. However, the focal spot 21 will become clearly and brightly visible when it coincides with an optical interface within the object such as the boundary 19 of a biological cell 20. Thus, by varying the position of the plane of the focal spot 21 of the marker laser beam, the position of the cell boundary 19 may be explored and the vertical dimension thereof measured without varying the position of the focusing plane or sharpness plane 23 of the microscope. Thereafter, by operating the control 6 to vary the setting of the variable focusing means 5, a desired distance d between the planes 22 and 24 containing the focal spots 21 and 25 of the marker and working laser beams, respectively, may be produced, and by operating again the control 9 of the variable focusing means 8 until the marker beam focal spot 21 becomes again visible by coinciding with the boundary 19 of the cell 20 the focal spot 25 for the working laser beam can be located the desired distance d from the boundary 19 of the cell 20 so as to coincide, for example, with the nucleus of the cell.

Figure 3:
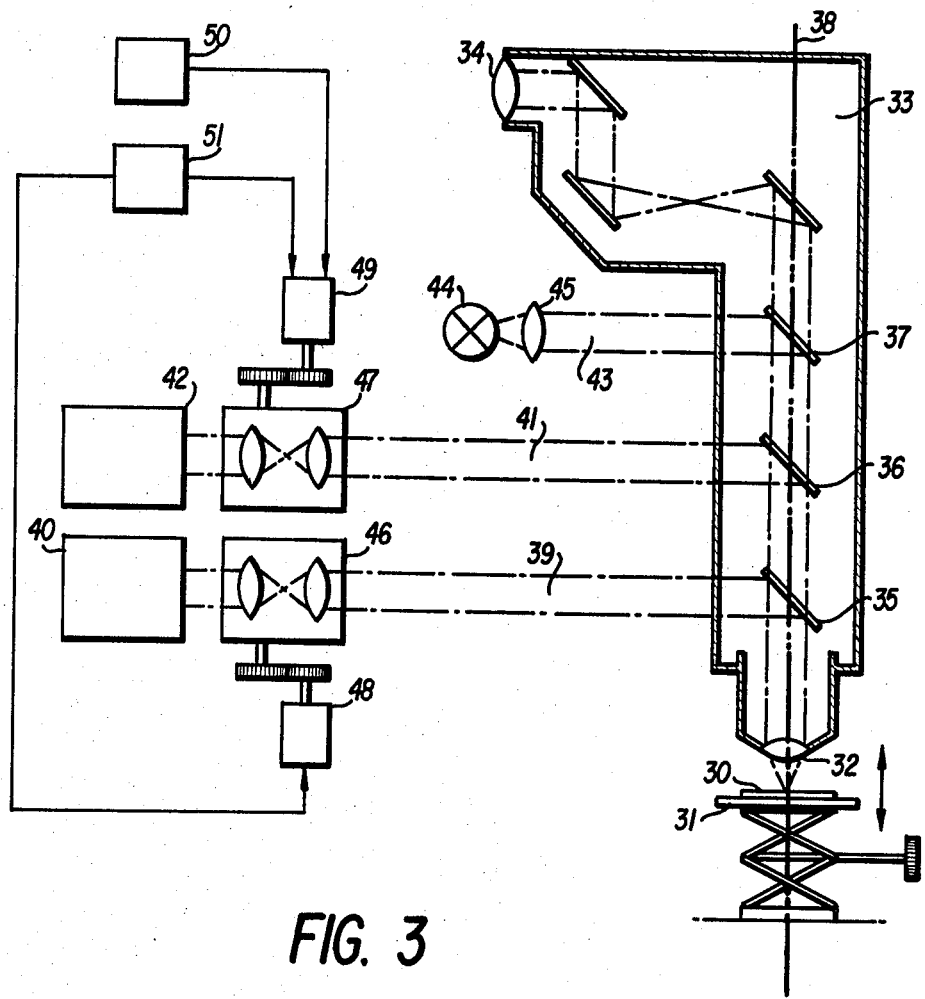
FIG. 3 is an elevational view, partly in section, and a block circuit diagram of the apparatus according to a modified embodiment.

In the embodiment shown in FIG. 3 an object 30 placed on a vertically movable support 31 is viewed through the objective lens 32 of a microscope 33 having an eyepiece 34. Semipermeable mirrors and beam splitters 35, 36 and 37 are used for collinearly coupling onto the optical axis 38 of the microscope 33 a working laser beam 39 produced by a working laser 40, a marker laser beam 41 produced by an auxiliary laser 42 and a general illuminating light beam 43 produced by a lamp 44 and collimating lens 45, respectively. Variable focusing means 46, 47, respectively, are placed into the paths of the working and marker laser beams 39, 41 and are controllable through associated stepping motors 48, 49, respectively. First control means 50 is provided for supplying stepping pulses only to the stepping motor 49 of the variable focusing means 47 for the marker laser beam 41. This serves for producing the desired longitudinal spacing between the working and marker laser beam focus spots produced by the microscope's objective 32. Second control means 51 is provided for supplying stepping pulses simultaneously to stepping motors 48, 49. This serves to jointly shift the position of the working and marker laser beam focal spots without varying the longitudinal distance therebetween. The operation of this embodiment when adjusting the focal spot of the working laser beam 39 to a particular target region within a transparent object is substantially the same as that explained with reference to FIGS. 1 and 2.

The invention is not limited to those embodiments shown and described. Various modifications and variations will be apparent to those of ordinary skill in the art. For example, in the embodiment of FIG. 3 instead of controlling the variable focusing means 46, 47 through stepping motors 48, 49 having common control means 51, the variable focusing means 46, 47 may be mechanically coupled to each other and to a manual or powered control, the coupling allowing for a selective setting of one of the variable focusing means independently of the other for producing the desired distance of the focal spots, and the manual or powered control serving for setting both variable focusing means jointly for jointly shifting the two focal spots.

What is claimed is:

1. Apparatus for adjusting the focal spot of a working laser beam onto a microscopic target region within a transparent biological object observed under a microscope to locate that focal spot a predetermined controllable microscopic distance from an interface of said object, said apparatus comprising
    (a) a microscope having an objective, an eyepiece, a support for said object and means to move said support so as to bring the target region of said object into the focusing plane of said objective;
    (b) a working laser for emitting a parallel laser beam and an auxiliary laser for emitting a parallel laser beam in the visible wavelength region along separate paths;
    (c) means for collinearly superimposing said two laser beams from said paths and for introducing the superimposed beams into the microscope so as to be focused jointly through said objective onto said object;
    (d) first variable focusing means interposed in the path of one of said laser beams;
    (e) second variable focusing means interposed in the path of said superimposed working and auxiliary laser beams, said second variable focusing means comprising a lens arrangement producing intermediate focal spots of said two laser beams and means for varying the distance of said intermediate focal spots from said microscope objective;
    (f) first control means for controlling said first variable focusing means so as to produce a longitudinal spacing of predetermined distance between the focal spots produced by said objective; and
    (g) second control means for controlling said second variable focusing means independently of said first variable focusing means for moving the two focal spots jointly without varying the distance therebetween;
    (h) whereby the focal spot of said auxiliary laser beam may be made to appear on an interface of said object and said working laser beam may be focused said predetermined distance from said interface.

2. Apparatus as defined in claim 1 wherein said first variable focusing means comprises a first lens arrangement interposed in the path of said one laser beam.

3. Apparatus for adjusting the focal spot of a working laser beam onto a microscopic target region within a transparent biological object observed under a microscope to locate that focal spot a predetermined controllable microscopic distance from an interface of said object, said apparatus comprising
    (a) a microscope having an objective, an eyepiece, a support for said object and means to move said support so as to bring the target region of said object into the focusing plane of said objective;
    (b) a working laser for emitting a parallel laser beam and an auxiliary laser for emitting a parallel laser beam in the visible wavelength region along separate paths;
    (c) means for collinearly superimposing said two laser beams from said paths and for introducing the superimposed beams into the microscope so as to be focused jointly through said objective onto said object;
    (d) first variable focusing means comprising a first lens arrangement interposed in the separate path of one of said laser beams;
    (e) second variable focusing means comprising a second lens arrangement interposed in the separate path of the other of said laser beams;
    (f) first control means for controlling said first variable focusing means and adapted to establish a predetermined difference in setting of said lens arrangements so as to produce a longitudinal spacing of predetermined distance between the focal spots produced by said objective; and
    (g) second control means for controlling both said first and second variable focusing means and adapted to jointly vary the setting of said two lens arrangements for moving the two focal spots jointly without varying the distance therebetween; and
    (h) whereby the focal spot of said auxiliary laser beam may be made to appear on an interface of said object and said working laser beam may be focused said predetermined distance from said interface.

4. Apparatus as defined in claim 3 further comprising stepping motors adapted to control said first and second lens arrangements and wherein said first control means is adapted to supply stepping pulses selectively to one of said stepping motors and said second control means is adapted to supply stepping pulses simultaneously to both said stepping motors.

* * * * *